(No Model.)

G. P. A. GUNTHER.
FISH TANK OR AQUARIUM.

No. 546,882. Patented Sept. 24, 1895.

Witnesses:
Alex. Barkoff
A. V. Groupe

Inventor:
George P. A. Gunther
by his Attorneys
Howson & Howson

UNITED STATES PATENT OFFICE.

GEORGE P. A. GUNTHER, OF PHILADELPHIA, PENNSYLVANIA.

FISH-TANK OR AQUARIUM.

SPECIFICATION forming part of Letters Patent No. 546,882, dated September 24, 1895.

Application filed December 19, 1892. Serial No. 455,629. (No model.)

*To all whom it may concern:*

Be it known that I, GEORGE P. A. GUNTHER, a citizen of the United States, and a resident of Philadelphia, Pennsylvania, have invented certain Improvements in Fish-Tanks or Aquariums, of which the following is a specification.

The object of my invention is to provide a fish-tank or aquarium with simple means whereby the overflow from said tank is drawn from all parts of the same and is caused to effect the cleaning of the tank, and this object I attain in the manner hereinafter set forth, reference being had to the accompanying drawings, in which—

Figure 1:
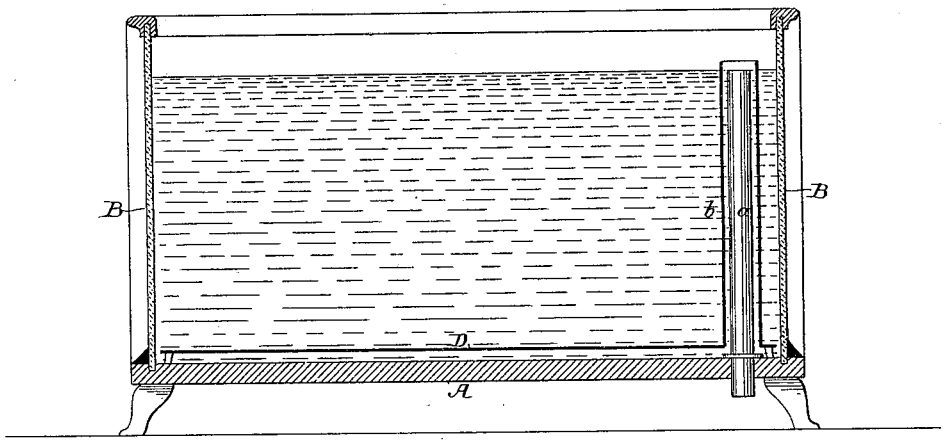
Figure 2:
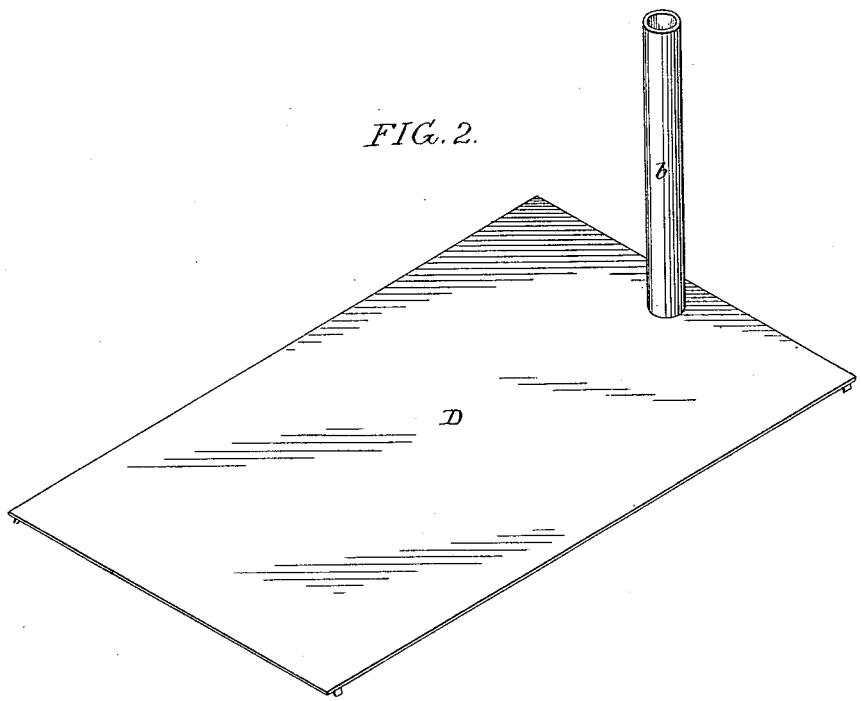

Figure 1 is a longitudinal sectional view of an ordinary form of fish-tank or aquarium, showing my improved attachment applied thereto; and Fig. 2 is a perspective view of said attachment.

A represents the base of the tank, and B the glass sides of the same, the tank having at one end an overflow-pipe $a$, extending up to the desired level. Within the tank and a short distance above the bottom of the same is a false bottom D, which consists of a plate of the same or substantially the same contour as the tank, but slightly less in dimensions than the interior of the tank, so as to form a passage all around said false bottom between the edges of the same and the sides of the tank. The false bottom D is supported at the desired height above the base of the tank by means of feet or by projections formed either upon the false bottom or upon the base, and said false bottom has near one end a tube $b$, open at the bottom and also by preference at the top, this tube being somewhat larger in diameter than the overflow-pipe $a$ and of such height as to project slightly above the top of said overflow-pipe, as shown in Fig. 1. Whenever fresh water is added to the tank, therefore, the overflow water finds its way around the edges of the false bottom D and through the space between said false bottom and the base of the tank and rises between the overflow-pipe $a$ and the tube $b$. A current is thus created over the entire surface of the false bottom D. Consequently any fish-slime or sediment which may be deposited upon the same is likely to be swept therefrom by such current, so that the tank is kept reasonably clean and any objectionable accumulations upon the bottom of the same are prevented. It will be understood that the plate D and its tube $b$ may be ornamented in any way that the taste of the designer may suggest, and the location of said tube upon the plate may be changed to accord with any change in the position of the overflow-pipe in the tank.

I am aware that fish-tanks have been constructed with duplex overflow-pipes communicating with the tank at or near the bottom of the same, and hence I do not broadly claim such construction, my present invention having been devised with the view of inducing a current in all parts of the tank and providing a simple and convenient means whereby ordinary fish-tanks having the usual top overflow can be readily converted into tanks with bottom outlet, said bottom outlet being so disposed around the tank as to cause a drainage current in all directions when the overflow is in operation.

Having thus described my invention, I claim and desire to secure by Letters Patent—

1. The combination of a fish tank or aquarium, with a false bottom of somewhat less area than the tank, and mounted at a short distance above the bottom of the tank so as to provide between the same and the walls and bottom of the tank, channels of contracted area for the escape of waste water, and an outlet communicating with the channel between the false bottom and the real bottom of the tank, substantially as specified.

2. A fish tank or aquarium having an overflow pipe in combination with a false bottom, having a tube surrounding said overflow pipe and projecting above the top of the same, said false bottom being of less dimensions than the interior of the tank so as to provide a drainage passage between its edges and the walls of the tank, substantially as specified.

In testimony whereof I have signed my name to this specification in the presence of two subscribing witnesses.

GEO. P. A. GUNTHER.

Witnesses:
 FRANK E. BECHTOLD,
 JOSEPH H. KLEIN.